United States Patent [19]
Vora et al.

[11] Patent Number: 5,450,728
[45] Date of Patent: Sep. 19, 1995

[54] RECOVERY OF VOLATILE ORGANIC COMPOUNDS FROM GAS STREAMS

[75] Inventors: Jayesh P. Vora, Allentown; James VanOmmeren, New Tripoli, both of Pa.

[73] Assignee: Air Products and Chemicals, Inc., Allentown, Pa.

[21] Appl. No.: 159,993

[22] Filed: Nov. 30, 1993

[51] Int. Cl.⁶ ............................................ F25J 3/06
[52] U.S. Cl. ........................................ 62/23; 62/11; 62/16
[58] Field of Search ............... 62/11, 16, 21, 23, 36

[56] References Cited

U.S. PATENT DOCUMENTS

| | | | |
|---|---|---|---|
| 575,714 | 1/1897 | Heinzerling . | |
| 1,040,886 | 10/1918 | Claude . | |
| 2,278,750 | 4/1942 | Walker | 62/16 |
| 2,500,129 | 3/1950 | Laverty | 62/27 |
| 2,641,114 | 6/1953 | Holthaus | 62/23 |
| 3,349,571 | 10/1967 | Nebgen | 62/23 |
| 3,374,637 | 3/1968 | Wenzke | 62/23 |
| 3,443,388 | 5/1969 | Kramer et al. | 62/23 X |
| 4,150,494 | 4/1979 | Rothchild | 34/28 |
| 4,237,700 | 12/1980 | Rothchild | 62/54 |
| 4,242,875 | 1/1981 | Schafer | 62/11 X |
| 4,444,016 | 4/1984 | Banerjee | 62/54 |
| 4,545,134 | 10/1985 | Mukerjee et al. | 34/27 |
| 5,214,924 | 6/1993 | Karthaus et al. | 62/11 |
| 5,291,738 | 3/1994 | Waldrop | 62/36 |
| 5,329,774 | 7/1994 | Tanguay et al. | 62/23 |

FOREIGN PATENT DOCUMENTS 2349113 11/1977 France .

OTHER PUBLICATIONS

*Encyclopedia of Chemical Technology*, 3rd edition; vol. 21; John Wiley & Sons; 1983; pp. 355–376.

*Primary Examiner*—Christopher Kilner
*Attorney, Agent, or Firm*—John M. Fernbacher

[57] ABSTRACT

Volatile organic compounds and water vapor are recovered from a low-boiling gas by compressing the gas to an elevated pressure and cooling the gas in stages to condense volatile components and water while avoiding freezing in the system. Operating the system at an elevated pressure increases condensation efficiency, reduces the number of stages required, and minimizes operating problems to avoid freezing.

12 Claims, 1 Drawing Sheet

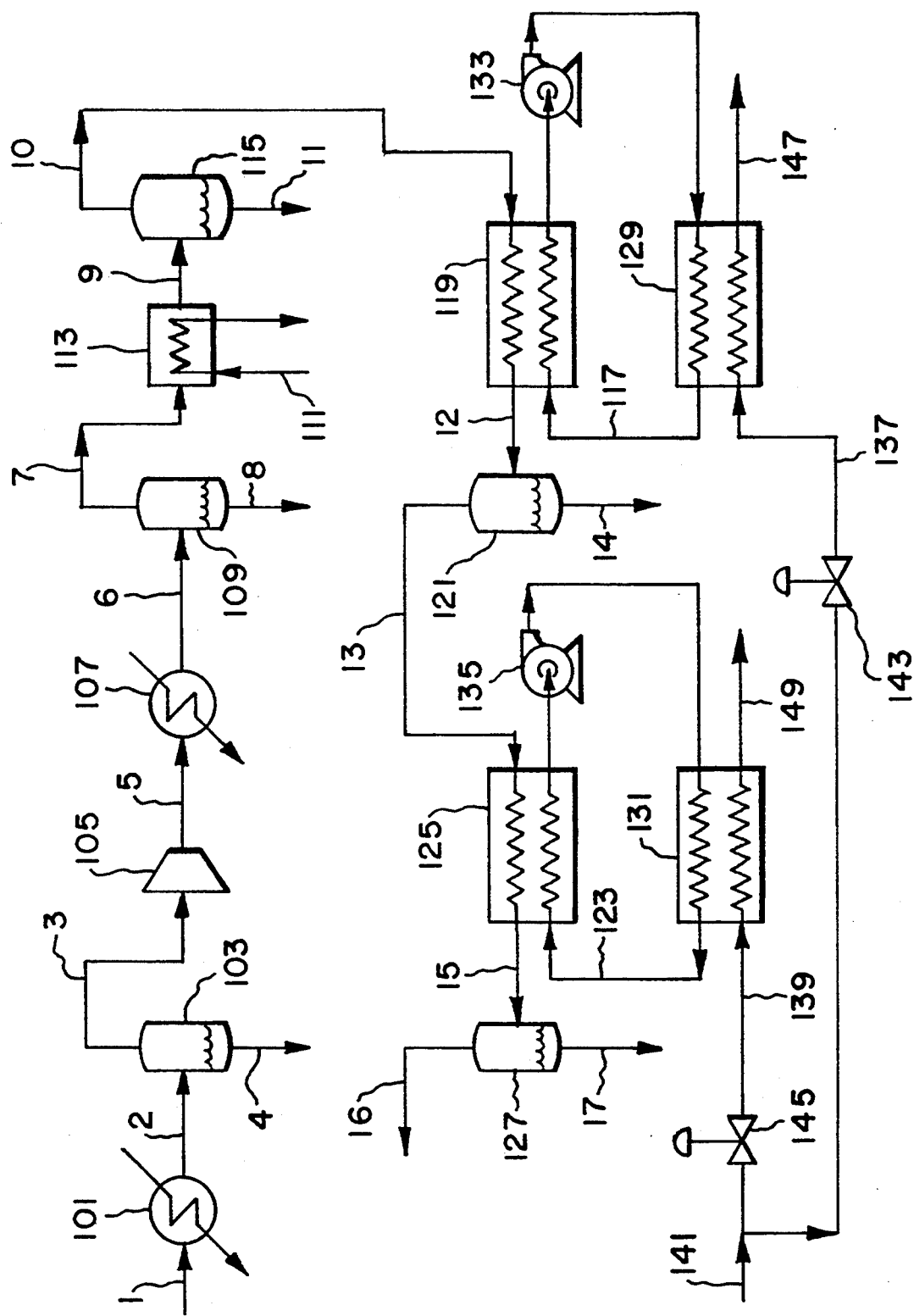

RECOVERY OF VOLATILE ORGANIC COMPOUNDS FROM GAS STREAMS

FIELD OF THE INVENTION

The present invention is directed towards the removal of volatile organic compounds and water from low,boiling gases such as air or nitrogen.

BACKGROUND OF THE INVENTION

The removal of volatile organic compounds (VOCs) from air or nitrogen is an important step in many industrial manufacturing processes in order to meet emission regulations, recover and recycle valuable reactants or solvents, and reuse gases such as nitrogen in the manufacturing process. This procedure is widely used for example in the petrochemical and pharmaceutical industries to treat dry streams containing one or more VOCs.

Volatile compounds can be removed from gas streams by several different methods. Among the oldest of methods is to compress and cool the gas stream, and expand the compressed stream for further cooling by autorefrigeration as disclosed by U.S. Pat. Nos. 575,714 and 1,040,886. Condensable components are removed therefrom at appropriate temperatures to avoid freezing.

Removal of volatile compounds by adsorption on solid adsorbents or by absorption in suitable liquids, followed by regeneration or distillation to recover the volatile components, are well-known methods as summarized for example in the *Encyclopedia of Chemical Technology*, Third Edition, Volume 21, John Wiley & Sons, 1983, pp. 355–376. Cooling by ambient cooling water or mechanical refrigeration can be used to supplement these methods.

Liquid nitrogen is used as a refrigeration source for volatile component recovery in a number of processes. Indirect cooling, in which the gas stream containing the volatile compounds is cooled by indirect heat exchange between the gas stream and vaporizing liquid nitrogen, is disclosed in U.S. Pat. Nos. 4,150,494, 4,237,700, and 5,214,924 and French Patent Publication No. 2,349,113. Another type of indirect cooling is disclosed in U.S. Pat. No. 4,545,134 in which vaporizing liquid nitrogen indirectly cools a recirculating stream of an intermediate heat transfer fluid such as toluene, which in turn cools a process stream containing residual volatile components. U.S. Pat. Nos. 4,444,016 and 4,545,134 teach the use of direct contact refrigeration using liquid nitrogen which is contacted with condensed vapor, which is used in turn to contact and cool the gas containing the vapor components. Mechanical refrigeration is used to precool the gas. All of the methods described above which use liquid nitrogen as the refrigerant are characterized by operation at pressures slightly above atmospheric. Similarly, all of the methods described above in which the VOC-laden gas is indirectly cooled to effect condensation operate at pressures slightly above atmospheric, which pressures are generated by the use of fans or blowers.

The presence of water with the volatile organic compounds in the gas stream can cause undesirable freezing, and the presence of water generally complicates the operation of recovery systems such as those described above. In addition, when extremely low concentrations of volatile components or high levels of recovery are required in the final purified gas, multiple stages must be used at successively lower temperatures, and these temperatures must be controlled carefully if water is present. It is desirable to minimize the number of such stages to reduce capital cost of the recovery system.

The method of the present invention, described in the following specification and defined in the claims which follow, addresses these problems in the recovery of volatile components from low-boiling gases, particularly when water is present and extremely low concentrations of volatile components are required in the final purified gas.

SUMMARY OF THE INVENTION

The invention is a method for recovering volatile organic compounds contained in admixture with low-boiling gas which comprises compressing a gaseous mixture comprising one or more volatile organic compounds and one or more low-boiling gases to a minimum pressure of at least 30 psia; and cooling, partially condensing, and separating the resulting compressed mixture at a first temperature to yield a first vapor and a first condensate stream. The first vapor stream is further cooled to a second temperature to yield a second stream containing mixed vapor and condensate, and separating the mixed stream into a second vapor and a second condensate stream. The second vapor stream comprises the low-boiling gases substantially reduced in the concentration of volatile organic compounds. The second temperature is controlled at a temperature above the initial freezing point of the second condensate stream. Operation of the system at or above the minimum pressure allows condensation at higher temperatures than those possible at a pressure below the minimum pressure, thereby reducing refrigeration requirements for cooling and the probability of freezing in the second condensate stream. The method is particularly useful when the low-boiling gas contains water vapor in addition to volatile organic compounds.

BRIEF DESCRIPTION OF THE DRAWING

The single Drawing is a schematic flowsheet of an embodiment of the present invention.

DETAILED DESCRIPTION OF THE INVENTION

The process of the present invention is an improved method for recovering volatile compounds, chiefly volatile organic compounds (VOCs) from low-boiling gases such as nitrogen or air. VOC removal to low residual concentrations is possible, thereby meeting strict emission regulations when the low-boiling gas is vented to the atmosphere. Alternately, the purified low-boiling gas can be readily used for other purposes within the manufacturing facility which generates the VOC-laden gas. Recovered VOCs, which are typically expensive solvents, can be reused thus minimizing the purchase of makeup solvent. The process of the present invention is characterized by improved efficiency which is achieved by operating the recovery system at significantly higher pressures than prior art solvent recovery systems using indirect refrigeration.

The invention is illustrated by a typical embodiment as given in the single Figure. Stream 1 is a low-boiling gas stream laden with volatile compounds, for example an offgas from sparging, stripping, and drying operations in a fatty amines manufacturing plant. The main low-boiling component is typically air or nitrogen, with the latter preferably used when the volatile compounds are flammable. The low-boiling component also may comprise $CO_2$ or light hydrocarbons having up to three carbon atoms. The stream typically contains VOCs such as isopropyl alcohol and methyl chloride, and often contains a significant amount of water vapor. Volatile organic compounds are defined herein as compounds which are volatile at ambient temperatures and have boiling points far above the low-boiling components in the gas stream. Water if present is also classified as a volatile component, since its boiling point is far above the low-boiling components in the gas stream. Stream 1 typically is at or above ambient temperature, at a low pressure up to about 15 psia, and contains up to 50 vol % volatile compounds. The stream is cooled against ambient cooling water if necessary in cooler 101; this step may condense 25 to 90% of the higher-boiling components present therein. Cooled vapor/liquid stream 2 flows to separator zone 103 from which vapor stream 3 and condensate stream 4 are withdrawn. In a key step of the process, vapor stream 3 is compressed to 30–150 psia by compressor 105, and hot compressed stream 5 is cooled against ambient cooling water in cooler 107. Cooled stream 6 passes to separator zone 109 from which vapor stream 7 and additional condensate 8 are withdrawn; about 5–40% of the remaining condensable components are removed in this step.

Vapor stream 7 is further cooled against refrigerant 111 in heat exchanger 113 to condense an additional fraction of the remaining volatile compounds. Further cooled stream 9 at between $-40°$ and $+40°$ F. passes to separator 115 from which vapor 10 and additional condensate 11 are withdrawn; about 1–10% of the remaining condensable components are removed in this step. The temperature and flow rate of refrigerant 111 are selected carefully so that the temperature in exchanger 113 is safely above the initial freezing point of condensate 11. Exchanger 113 is preferably operated at the lowest possible temperature in order to maximize the removal of condensate consistent with the need to avoid freezing. Because the flow rate and composition of stream 9 can fluctuate due to upstream process changes or upsets, the actual operating temperature in exchanger 113 is typically set above the initial freezing point of condensate 11 by a selected safety factor. Composition changes upstream also can affect the composition and initial freezing point of condensate 11. Refrigerant 111 is typically supplied from a brine chiller or freon refrigeration system (not shown) and has a temperature between about $-45°$ F. and $+35°$ F. Heat exchanger 113 and separator 115 are shown as separate pieces of equipment but may be combined in a single condenser/separator unit as is known in the art. At this point, low-boiling gas stream 10 has a substantially reduced concentration of condensable components, wherein by definition at least 70% of the original condensable components have been removed.

Gas stream 10, now at $-40°$ to $+40°$ F. and significantly depleted of higher-boiling condensable components, is further cooled against cold recirculating liquid 117 in exchanger 119 and passes into separator 121 at a temperature of $-40°$ to $-100°$ F. Vapor 13 and additional condensate 14 are withdrawn therefrom; the recovery of the remaining lower-boiling components in this step ranges from 10 to 99+%. Exchanger 119 is preferably operated at the lowest possible temperature in order to maximize the removal of condensate consistent with the need to avoid freezing. Because the flow rate and composition of stream 12 can fluctuate due to upstream process changes or upsets, the actual operating temperature in exchanger 119 is typically set above the initial freezing point of condensate 14 by a selected safety factor. Composition changes upstream also can affect the composition and initial freezing point of condensate 14. Cold recirculating liquid 117 is supplied at a temperature between about $-45°$ F. and $-105°$ F. Heat exchanger 119 and separator 121 are shown as separate pieces of equipment but may be combined in a single condenser/separator unit as is known in the art. At this point, the low-boiling gas stream is substantially free of condensable components, wherein by definition at least 90% of the original condensable components have been removed.

Vapor stream 13 may contain a sufficiently low concentration of volatile compounds such that it can be vented or reused elsewhere in the manufacturing plant which generates initial vapor stream 1. If further removal of volatile compounds from vapor 13 is required, a final stage of cooling may be utilized, in which case vapor stream 13 is further cooled against cold recirculating liquid 123 in exchanger 125 and passes into separator 127 at a temperature of $-70°$ to $-310°$ F. The actual temperature will depend upon the initial freezing point of liquid 123 and the required level of VOC recovery. Vapor 16 and additional condensate 17 are withdrawn therefrom. Exchanger 125 is preferably operated at the lowest possible temperature in order to maximize the removal of condensate consistent with the need to avoid freezing. Because the flow rate and composition of stream 15 can fluctuate due to upstream process changes or upsets, the actual operating temperature in exchanger 125 is typically set above the initial freezing point of condensate 17 by a selected safety factor. Composition changes upstream also can affect the composition and initial freezing point of condensate 17. Cold recirculating liquid 123 is supplied at a temperature between about $-75°$ F. and $-315°$ F. Heat exchanger 125 and separator 127 are shown as separate pieces of equipment but may be combined in a single condenser/separator unit as is known in the art.

Final treated vapor stream 16 contains typically less than 0.5 vol % of residual volatile components which reflects the removal of 99+% of the condensable components in stream 1. At this point, the low-boiling gas stream is essentially free of condensable components, wherein by definition at least 99% of the original condensable components have been removed. Stream 16 is cold, typically between $-70°$ F. and $-310°$ F., and is pressurized at about 15 to 145 psia. The refrigeration content of this stream may be used to supplement refrigeration in upstream steps or used for other purposes as desired. Likewise the pressure energy in stream 16 may be recovered in an expansion device if desired. Stream 16 may be recycled to the manufacturing plant which generates initial vapor stream 1, or alternatively may be vented to the atmosphere in compliance with emission regulations for the residual volatile compounds remaining therein.

Cold recirculating liquids 117 and 123 are selected to have moderate viscosity and acceptable heat transfer characteristics at the temperatures of exchangers 119 and 125. These liquids are selected based on their refrigeration characteristics (bubble point, freezing point, specific heat) relative to the exchanger temperatures, and are typically selected from a list of acceptable chlorofluorocarbon refrigerants usually known as freons. Liquids 117 and 123 are cooled by recirculation through exchangers 129 and 131 by pumps 133 and 135 respectively. Refrigeration is provided by vaporizing cryogenic liquid refrigerant streams 137 and 139, preferably liquid nitrogen, passing through exchangers 129 and 131. The temperatures of recirculating fluids 117 and 123 are controlled by controlling the flow of liquid nitrogen supply 141 by control valves 143 and 145. Nitrogen vapor streams 147 and 149 can be used elsewhere for inerting, purging, refrigeration, or other purposes as desired. The use of cold recirculating liquids 117 and 123 to cool the gas stream containing volatile components avoids possible cold spots in exchangers 129 and 131 which could occur if liquid nitrogen were used directly in these exchangers, and also provides a means for better temperature control. By avoiding cold spots, the possibility of freezing on the gas side of exchangers 129 and 131 is minimized.

The key feature of the invention as described above is the compression of vapor stream 3 to 20–150 psia and the operation of the entire volatile component removal system at or slightly below that pressure. This differs from prior art volatile component removal systems of the external refrigeration condensing type discussed earlier, all of which operate at feed pressures sufficient only to compensate for pressure drop through the system. Operating the process of the present invention at an elevated pressure is advantageous to efficient condensation, and allows the condensation of liquid in the various refrigerated stages at significantly higher dew point temperatures than would otherwise occur at lower operating pressures. Since condensation occurs at higher temperatures, less external refrigeration is needed. In addition, by operating the system at an elevated pressure a higher fraction of the condensable components is removed per stage, which reduces the number of stages required to achieve a given residual concentration of condensable components. Further, by removing a higher fraction of condensables in a given stage, the succeeding stage can be operated at a lower temperature without freezing because the liquid will contain a lower concentration of the heavier, higher-boiling components. In addition, operating at elevated pressures can reduce the number of refrigerated stages required to achieve a given level of condensate removal compared with operation at lower pressures. Low pressure operation will require higher separator temperatures to avoid freezing, since there will be a higher concentration of higher-boiling components in the liquid from each stage, and therefore more stages will be required or a complicated condensation/freezing process and controls will be necessary.

The present invention utilizes an important thermodynamic characteristic of vapor/condensate phase equilibrium systems of this type, namely, that pressure has a much larger effect upon the dew point temperature of a mixture than upon the freezing point of the resulting dew point liquid. This means for example that the dew point of stream 10 for a typical composition (as illustrated in Examples below) is 14.9° F. at a pressure of 95 psia, while the dew point is −18.1° F. at a pressure of 20 psia. However, the initial freezing point of the 95 psia dew point liquid is −154.4° F. and that of the 20 psia dew point liquid is also −154.4° F.

The increased temperature difference between the dew point of the vapor and the freezing point of the resulting dew point liquid, as realized in the present invention by operation at elevated pressures, allows improved operating flexibility of the system. For example, in the operation of the system of the Figure an upset condition could occur in which the flow rate of VOC-laden gas 1 decreased suddenly and/or the concentration of higher-boiling components (e.g. water) increased suddenly which would raise the initial freezing point of the condensate. In such a case, the temperature of a saturated vapor stream such as stream 10 in the Figure would decrease significantly while the freezing point of condensate 14 would increase. When the system is operated at a low pressure (below say 20 psia), freezing could readily occur within exchanger 119 or separator 121. When the system is operated at the higher pressure of the present invention (i.e. 30–150 psia), however, the temperature of stream 10 will be higher, and therefore,further above the freezing point of condensate 14. This affords a margin of safety which reduces the possibility that freezing will occur within exchanger 119 or separator 121 before corrective action is taken to reduce the flow rates of refrigerants 111 and 117.

The method of the present invention is particularly useful for low-boiling gases which contain water in addition to volatile organic compounds. The presence of water in condensed mixtures with VOCs significantly increases the initial freezing point of the condensate whether one or two immiscible liquid phases exist. Water solubility in a single-phase condensate can occur below the freezing point of pure water, complicating the choice of operating temperature required to avoid freezing. Operation at elevated pressures removes more water at higher temperatures, thus minimizing the problems with residual water at lower temperatures in later stages of the removal system.

Operating control of the system in response to normal fluctuations in the flow rate and properties of VOC-laden gas 1 can be achieved by several operational modes. One of these is to control the system pressure by throttling the discharge of compressor 105 in response to a selected downstream temperature in the system. Alternatively, it is possible to control the temperature of each separation stage by regulating the flow of refrigerant to each stage. In another mode of operation, the composition of the vapor stream to a given stage is determined by an online analyzer, and this composition is used to calculate the composition and freezing point of the resulting liquid condensed at the temperature of the given stage by using real time simulation of the system phase equilibria properties. If the calculated freezing point approaches or exceeds the actual stage temperature, the stage temperature is increased by reducing the refrigerant flow to that stage, which thereby eliminates the potential for undesirable freezing. This can be applied to multiple stages if required.

EXAMPLE 1

The system illustrated in the Figure was simulated by performing heat and material balances for a VOC-laden nitrogen stream 1 containing 16.8 mole % isopropanol, 15.0 mole % methyl chloride, 14.0 mole % water, and 0.0010 mole % HCl at 16.7 psia and 160° F. A stream summary for the simulation is given in Table 1. Stream 1 is typical of a solvent-laden stream from fatty amine processing. The stream is cooled, condensate 4 is removed, the vapor is compressed to 95 psia and cooled, and additional condensate 8 is removed At this point about 68.0% of the initial condensable components, mostly isopropanol and water, have been removed. Vapor 7 is further cooled against refrigerant 111, typically chilled brine or freon provided by a mechanical refrigeration system (not shown), and condensate 11 is removed which represents an additional 5.0% of the original condensable components. Vapor 10 is further cooled to −60° F. against cold recirculating liquid 117 (brine or freon as above) and condensate 14 is removed representing an additional 21.54% of the original condensable components. Vapor 13 is further cooled which allows the condensation of water and higher-boiling organics at temperatures well above freezing, thus permitting higher levels of VOC recovery or a reduction of the required number of stages for a given recovery. In addition, the larger difference between the dew point and freezing point temperatures in the present invention allows much more flexible operation to avoid freezing with a greater margin for error under upset conditions.

TABLE 2

| | Comparison of Dew Points and Freezing Points (Temperatures in °F.) | | | | | | |
|---|---|---|---|---|---|---|---|
| | Present Invention | | | | Low Pressure Operation | | |
| Stream | Press., psia | Dew Point | Freezing Point | Difference | Press., psia | Dew Point | Freezing Point | Difference |
| 5 | 95.0 | 159.8 | 32.0 | 127.8 | 21.0 | 103.2 | 32.0 | 71.2 |
| 9 | 93.5 | 94.7 | −2.2 | 96.9 | 19.5 | 48.9 | −2.2 | 51.1 |
| 12 | 92.5 | 14.6 | −154.4 | 169.0 | 18.5 | −18.1 | −154.4 | 136.3 |
| 15 | 91.5 | −60.2 | −182.6 | 122.4 | 17.5 | −104.3 | −182.6 | 78.3 |

TABLE 1

STREAM SUMMARY - EXAMPLE 1

| | Stream No. | | | | | | | | | | | | | | | | |
|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 |
| Pressure, psia | 16.7 | 16.2 | 15.7 | 15.7 | 95.0 | 94.5 | 94.0 | 94.0 | 93.5 | 93.0 | 93.0 | 92.5 | 92.0 | 92.0 | 91.5 | 91.0 | 91.0 |
| Temperature, °F. | 160 | 95 | 94 | 94 | 367 | 95 | 95 | 95 | 15 | 15 | 15 | −60 | −60 | −60 | −140 | −140 | −140 |
| Flow, moles/hr. | 39.6 | 39.6 | 30.4 | 9.2 | 30.4 | 30.4 | 27.3 | 3.1 | 27.3 | 26.4 | 0.9 | 26.3 | 22.4 | 3.9 | 22.4 | 21.4 | 1.0 |
| Composition, mole % | | | | | | | | | | | | | | | | | |
| Nitrogen | 54.1 | 54.1 | 70.6 | 0.02 | 70.6 | 70.6 | 78.5 | 0.1 | 78.5 | 81.3 | 0.2 | 81.3 | 95.3 | 0.6 | 95.3 | 99.8 | 0.9 |
| 2-propanol | 16.8 | 16.8 | 6.2 | 51.9 | 6.2 | 6.2 | 1.0 | 51.7 | 1.0 | 0.02 | 29.6 | 0.02 | 0.00 | 0.16 | 0.00 | 0.00 | 0.00 |
| Methyl Chloride | 15.0 | 15.0 | 19.0 | 1.8 | 19.0 | 19.0 | 19.7 | 12.6 | 19.7 | 18.7 | 50.7 | 18.7 | 4.7 | 99.0 | 4.7 | 0.20 | 99.3 |
| Water | 14.0 | 14.0 | 4.2 | 46.3 | 4.2 | 4.2 | 0.7 | 35.5 | 0.7 | 0.04 | 19.8 | 0.04 | 0.00 | 0.27 | 0.00 | 0.00 | 0.00 |
| HCl ($\times 10^{-3}$) | 1.0 | 1.0 | 1.3 | 0.02 | 1.3 | 1.3 | 1.4 | 0.1 | 1.4 | 1.5 | 0.4 | 1.5 | 1.4 | 1.8 | 1.4 | 1.0 | 10.6 | to −140° F. against cold recirculating liquid 123 and condensate 17 (essentially methyl chloride) is withdrawn, yielding a total removal of 98.9% of the original condensable components. Final purified vapor 16 contains 99.8 mole % nitrogen.

EXAMPLE 2

The freezing points of streams 5, 9, 12 and 15 were calculated for the conditions of Example 1 and compared with the dew point temperatures of these streams for the present invention operated at a pressure of 95 psia and for prior art low pressure operation at 25 psia. The results are summarized in Table 2 and show that liquid begins to condense at a significantly higher temperature for the present invention compared with low pressure operation of the prior art. Condensation at the higher pressure of the present invention reduces refrigeration requirements and the number of stages required to achieve a given level of VOC removal. In addition, the difference between the dew point and freezing point temperatures is much higher for the present invention,

EXAMPLE 3

The heat and material balance simulation of Example 1 was repeated at a system feed pressure of 21 psia which is the typical maximum pressure in prior art volatile component removal systems of the external refrigeration condensing type. The low-pressure system configuration and temperatures were selected to give the same total condensate removal of Example 1 while avoiding freezing in each stage. The results are summarized in Table 3.

TABLE 3

STREAM SUMMARY FOR LOW PRESSURE FOUR STAGE OPERATION

| | Stream No. | | | | | | | | | | | | | |
|---|---|---|---|---|---|---|---|---|---|---|---|---|---|---|
| | 1 | 2 | 3 | 4 | 6 | 7 | 8 | 9 | 10 | 11 | 12 | 13 | 14 |
| Pressure, psia | 21.0 | 20.5 | 20.0 | 20.0 | 19.5 | 19.0 | 19.0 | 18.5 | 18.0 | 18.0 | 17.5 | 17.0 | 17.0 |
| Temperature, °F. | 160 | 95 | 95 | 95 | 15 | 15 | 15 | −60 | −60 | −60 | −140 | −140 | −140 |
| Flow, moles/hr | 39.6 | 39.6 | 29.6 | 10.0 | 29.6 | 27.0 | 2.6 | 27.0 | 26.4 | 0.5 | 26.4 | 21.6 | 4.8 |
| Composition, mole % | | | | | | | | | | | | | |
| Nitrogen | 54.1 | 54.1 | 72.3 | 0.02 | 72.3 | 79.3 | 0.02 | 79.3 | 81.1 | 0.1 | 8.1 | 99.1 | 0.1 |
| 2-propanol | 16.8 | 16.8 | 5.0 | 52.1 | 5.0 | 0.2 | 54.1 | 0.2 | 0.0007 | 11.0 | 0.001 | 0.00 | 0.0036 |
| Methyl Chloride | 15.0 | 15.0 | 19.3 | 2.4 | 19.3 | 20.3 | 8.6 | 20.3 | 18.9 | 81.7 | 18.9 | 0.9 | 99.8 |
| Water | 14.0 | 14.0 | 3.4 | 45.5 | 3.4 | 0.2 | 37.3 | 0.2 | 0.005 | 7.2 | 0.005 | 0.0 | 0.02 |
| HCl ($\times 10^{-3}$) | 1.0 | 1.0 | 1.3 | 0.02 | 1.3 | 1.5 | 0.1 | 1.5 | 1.5 | 0.3 | 1.5 | 1.2 | 2.7 |

EXAMPLE 4

The heat and material balance simulation of Example 3 was repeated at a system feed pressure of 21 psia for seven stages of separation and the results are summarized in Table 4. Heat exchange, separator, and stream designations are not included in the Figure for stages 6 and 7, and are described as follows: stream 16 of the Figure is cooled to −120° F. to yield a stream 18 which is separated into a vapor 19 and a condensed liquid 20. Vapor 19 is further cooled to −140° F. to yield a stream 21 which is separated into a vapor 22 and a condensed liquid 23.

TABLE 4

STREAM SUMMARY FOR LOW PRESSURE SEVEN STAGE OPERATION

| | Stream No. | | | | | | | | | | | |
|---|---|---|---|---|---|---|---|---|---|---|---|---|
| | 1 | 2 | 3 | 4 | 6 | 7 | 8 | 9 | 10 | 11 | 12 | 13 |
| Pressure, psia | 21.0 | 20.5 | 20.0 | 20.0 | 19.5 | 19.0 | 19.0 | 18.5 | 18.0 | 18.0 | 17.5 | 17.0 |
| Temperature, °F. | 160 | 95 | 95 | 95 | 15 | 15 | 15 | −60 | −60 | −60 | −80 | −80 |
| Flow, moles/hr | 39.6 | 39.6 | 29.6 | 10.0 | 29.6 | 27.0 | 2.6 | 27.0 | 26.4 | 0.6 | 26.4 | 24.4 |
| Composition, mole % | | | | | | | | | | | | |
| Nitrogen | 54.1 | 54.1 | 72.3 | 0.02 | 72.3 | 79.3 | 0.02 | 79.3 | 81.1 | 0.1 | 81.1 | 88.0 |
| 2-propanol | 16.8 | 16.8 | 5.0 | 52.1 | 5.0 | 0.2 | 54.1 | 0.2 | 0.001 | 11.0 | 0.001 | 0.0 |
| Methyl Chloride | 15.0 | 15.0 | 19.3 | 2.4 | 19.3 | 20.3 | 8.6 | 20.3 | 18.9 | 81.7 | 18.9 | 12.0 |
| Water | 14.0 | 14.0 | 3.4 | 45.5 | 3.4 | 0.2 | 37.3 | 0.2 | 0.005 | 7.2 | 0.005 | 0.0 |
| HCl ($\times 10^{-3}$) | 1.0 | 1.0 | 1.3 | 0.02 | 1.3 | 1.5 | 0.06 | 1.5 | 1.5 | 0.3 | 1.5 | 1.6 |

| | Stream No. | | | | | | | | | |
|---|---|---|---|---|---|---|---|---|---|---|
| | 14 | 15 | 16 | 17 | 18 | 19 | 20 | 21 | 22 | 23 |
| Pressure, psia | 17.0 | 16.5 | 16.0 | 16.0 | 15.5 | 15.0 | 15.0 | 14.5 | 14.0 | 14.0 |
| Temperature, °F. | −80 | −100 | −100 | −100 | −120 | −120 | −120 | −140 | −140 | −140 |
| Flow, moles/hr | 2.1 | 24.4 | 22.8 | 1.5 | 22.8 | 22.1 | 0.8 | 22.1 | 21.7 | 0.4 |
| Composition, mole % | | | | | | | | | | |
| Nitrogen | 0.1 | 88.0 | 93.9 | 0.1 | 93.9 | 97.2 | 0.1 | 97.2 | 98.9 | 0.1 |
| 2-propanol | 0.008 | 0.0 | 0.0 | 0.0 | 0.0 | 0.0 | 0.0 | 0.0 | 0.0 | 0.0 |
| Methyl Chloride | 99.8 | 12.0 | 6.1 | 99.9 | 6.1 | 2.8 | 99.9 | 2.8 | 1.1 | 99.9 |
| Water | 0.1 | 0.0 | 0.0 | 0.0004 | 0.0 | 0.0 | 0.0 | 0.0 | 0.0 | 0.0 |
| HCl ($\times 10^{-3}$) | 0.6 | 1.6 | 1.6 | 1.0 | 1.6 | 1.6 | 1.6 | 1.6 | 1.6 | 2.8 |

A comparison of the results for Examples 1, 3, and 4 is given in Table 5 for MeCl recovery and purity of the recovered nitrogen. It is seen that operation at the elevated pressure of the present invention using four stages gives higher MeCl recovery and higher nitrogen purity than operation at the lower prior art pressure for either four or seven stages. The purity of the recovered MeCl is acceptable in all cases.

TABLE 5

EFFECT OF FEED PRESSURE ON VOC RECOVERY

| Feed Pressure, psia | Number of Stages | MeCl Recovery % of Feed | Recovered MeCl Purity, Mole % | Recovered Nitrogen Purity, Mole % |
|---|---|---|---|---|
| 93 | 4 | 98.9 | 99.3 | 99.8 |
| 21 | 4 | 96.6 | 99.8 | 99.1 |
| 21 | 7 | 95.9 | 99.9 | 98.9 |

Thus the method of the present invention allows the efficient removal and recovery of volatile organic compounds from low-boiling gases such as nitrogen or air to yield a purified gas for venting or reuse. By operating the process at elevated pressures, in contrast with the significantly lower pressures of prior art methods, more efficient removal is achieved and fewer stages are required compared for given recovery levels and final gas purity. The method is especially useful for solvent-laden gases which also contain water because operation to avoid freezing in the stages is more easily achieved.

The essential characteristics of the present invention are described completely in the foregoing disclosure. One skilled in the art can understand the invention and make various modifications thereto without departing from the basic spirit thereof, and without departing from the scope of the claims which follow.

We claim:

1. A method for recovering one or more volatile compounds contained in admixture with one or more low-boiling gases which comprises:
   (a) compressing a gaseous mixture comprising said one or more volatile organic compounds and one or more low-boiling gases to a pressure of at least 30 psia; and cooling, partially condensing, and separating the resulting compressed mixture at a first temperature to yield a first vapor and a first condensate stream;
   (b) further cooling said first vapor stream to a second temperature to yield a second stream containing mixed vapor and condensate, and separating the mixed stream into a second vapor and a second condensate stream having a first initial freezing point, said second vapor stream comprising said one or more low-boiling gases having a substantially reduced concentration of said volatile organic compounds; and
   (c) cooling said second vapor stream to a third temperature by indirect heat exchange with a first cold recirculating liquid which is cooled in turn by indirect heat exchange with a first stream of vaporizing liquid nitrogen to yield a third mixed stream containing vapor and condensate, and separating the third mixed stream into a third vapor and a third condensate stream having a second initial freezing point, said third vapor stream comprising said one or more low-boiling gases substantially free of residual volatile organic compounds;
   wherein said second temperature is controlled at a temperature above said first initial freezing point of said second condensate stream and said third temperature is controlled at a temperature of −40° to −100° F. which is above said second initial freezing point of said third condensate stream, whereby operation of steps (a), (b), and (c) at a pressure of at least 30 psia allows condensation at higher temperatures than those possible at a pressure below 30 psia, thereby reducing refrigeration requirements for said cooling and the probability of freezing in said second and third condensate streams.

2. The method of claim 1 wherein said cooling of the resulting compressed mixture to said first temperature is achieved by indirect heat exchange with ambient cooling water.

3. The method of claim 1 wherein said second temperature is between +40° and −40° F.

4. The method of claim 3 wherein said second temperature is achieved by indirect heat exchange between said first vapor stream and a refrigerant supplied by an external refrigeration system.

5. The method of claim 1 wherein said first cold recirculating liquid is a chlorofluorocarbon refrigerant.

6. The process of claim 1 which further comprises (d) cooling said third vapor stream to a fourth temperature to yield a fourth mixed stream containing vapor and condensate, and separating the fourth mixed stream into a fourth vapor and a fourth condensate stream having a third initial freezing point, said fourth vapor stream comprising said one or more low-boiling gases essentially free of said volatile organic compounds; wherein said fourth temperature is controlled at a temperature above said third initial freezing point of said fourth condensate stream, whereby operation of steps (a), (b), (c), and (d) at a pressure of at least 30 psia allows condensation at higher temperatures than those possible at a pressure below 30 psia, thereby reducing refrigeration requirements for said cooling and the probability of freezing in said second, third, and fourth condensate streams.

7. The method of claim 6 wherein said fourth temperature is between $-100°$ and $-310°$ F.

8. The method of claim 7 wherein said fourth temperature is achieved by indirect heat exchange between said third vapor stream and a second cold recirculating liquid.

9. The method of claim 8 wherein said second cold recirculating liquid is a chlorofluorocarbon refrigerant.

10. The method of claim 8 wherein said second cold recirculating liquid is cooled by indirect heat exchange with a second stream of vaporizing liquid nitrogen.

11. The method of claim 1 wherein said one or more low-boiling gases are selected from the group consisting of air, nitrogen, light hydrocarbons having up to three carbon atoms, and $CO_2$.

12. The method of claim 1 wherein said gaseous mixture further comprises water.

* * * * *